US010508558B2

(12) United States Patent
Bortoli et al.

(10) Patent No.: US 10,508,558 B2
(45) Date of Patent: Dec. 17, 2019

(54) RAM AIR TURBINE BLADES

(71) Applicant: Hamilton Sundstrand Corporation, Charlotte, NC (US)

(72) Inventors: Stephen M. Bortoli, Roscoe, IL (US); Paul M. Reinhard, Marengo, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 293 days.

(21) Appl. No.: 15/430,067

(22) Filed: Feb. 10, 2017

(65) Prior Publication Data
US 2018/0230834 A1 Aug. 16, 2018

(51) Int. Cl.
*F01D 7/00* (2006.01)
(52) U.S. Cl.
CPC ............ *F01D 7/00* (2013.01); *F05D 2220/34* (2013.01); *F05D 2260/52* (2013.01)
(58) Field of Classification Search
CPC ... F01D 7/00; F01D 5/323; F01D 5/02; F05D 2220/34; F05D 2200/52; F05D 2200/31; F05D 2200/10
See application file for complete search history.

(56) References Cited

U.S. PATENT DOCUMENTS

| 2,963,093 | A | * | 12/1960 | Drexel | F03D 7/0224 416/132 B |
| 9,869,190 | B2 | * | 1/2018 | Niergarth | F01D 7/02 |
| 2006/0239817 | A1 | * | 10/2006 | Nohr | B64D 41/007 416/46 |
| 2012/0328436 | A1 | * | 12/2012 | Soidel | B64D 41/007 416/47 |
| 2014/0322013 | A1 | * | 10/2014 | Elkin | F03D 7/041 416/131 |

* cited by examiner

*Primary Examiner* — Syed O Hasan
(74) *Attorney, Agent, or Firm* — Locke Lord LLP; Daniel J. Fiorello; Joshua L. Jones

(57) ABSTRACT

A blade for a ram air turbine includes a pitch rotation connector configured to connect to a pitch rotation device configured to control rotation of the blade about a pitch axis and an airfoil rotationally fixed to the pitch rotation connector. The pitch rotation connector is positioned on the airfoil to reduce pitch dependent moment about the pitch axis such that a maximum pressure moment about the pitch axis is less than a torque supplied to the blade via the pitch rotation device. The position of the pitch rotation connector can be configured to prevent and/or dampen pitch oscillation due to a changing load on the spring and mass governor.

14 Claims, 4 Drawing Sheets

RAM AIR TURBINE BLADES

BACKGROUND

1. Field

The present disclosure relates to ram air turbines (RATs), more specifically to blades for RATs.

2. Description of Related Art

In certain ram air turbines (RATs), each blade is connected to the turbine through a spring/mass governor system. When there is a change in load on the turbine, the governor changes the pitch of blades to keep a constant speed of rotation. However, a problem has been that this can cause a governor resonance characterized by back and forth pitch adjustment as a result of forces on the airfoil and the governor attempting to correct.

Such conventional methods and systems have generally been considered satisfactory for their intended purpose. However, there is still a need in the art for ram air turbine blades. The present disclosure provides a solution for this need.

SUMMARY

A blade for a ram air turbine includes a pitch rotation connector configured to connect to a pitch rotation device configured to control rotation of the blade about a pitch axis and an airfoil rotationally fixed to the pitch rotation connector. The pitch rotation connector is positioned on the airfoil to reduce pitch dependent moment about the pitch axis such that a maximum pressure moment about the pitch axis is less than a torque supplied to the blade via the pitch rotation device. The position of the pitch rotation connector can be configured to prevent and/or dampen pitch oscillation due to a changing load on the spring and mass governor.

In certain embodiments, the airfoil can include a sweep. The root center of pressure of the airfoil can be forward of the pitch axis and a tip center of pressure of the airfoil can be aft of the pitch axis. In certain embodiments, the pitch axis can extend through an average center of pressure of the airfoil such that pressure moment is cancelled out at any pitch angle.

The pitch rotation device can be a pitch governor such that the pitch rotation connector is configured to connect to a pitch governor. The pitch governor can be a spring and mass governor. The airfoil can be surface processed to improve fatigue life.

In accordance with at least one aspect of this disclosure, a ram air turbine (RAT), can include any suitable embodiment of a blade as described herein. In accordance with at least one aspect of this disclosure, a method can include preventing and/or damping a pitch oscillation state of a ram air turbine blade by reducing pitch dependent moment about a pitch axis. Reducing pitch dependent moment about the pitch axis can include using a swept blade such that the pitch axis is located between a root center of pressure and a tip center of pressure.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
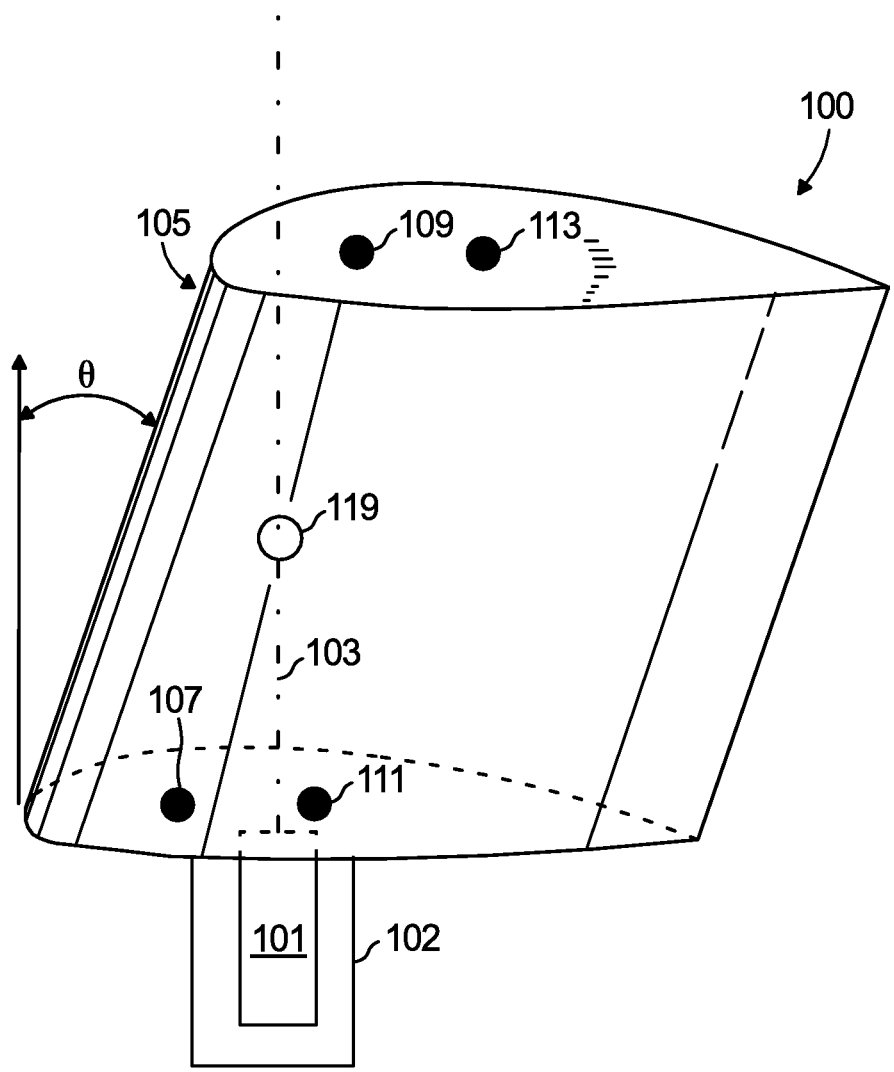
FIG. 1 is a perspective illustrative view of an embodiment of a blade in accordance with this disclosure, schematically showing an axis of rotation extending through the airfoil in relation to center of pressure and centroid.

Reference will now be made to the drawings wherein like reference numerals identify similar structural features or aspects of the subject disclosure. For purposes of explanation and illustration, and not limitation, an illustrative view of an embodiment of a blade in accordance with the disclosure is shown in FIG. 1 and is designated generally by reference character 100. Other embodiments and/or aspects of this disclosure are shown in FIGS. 2-5. The systems and methods described herein can be used to improve ram turbine performance and blade longevity, for example.

Referring to FIG. 1, a blade 100 for a ram air turbine (not shown) includes a pitch rotation connector 101 configured to connect to a pitch rotation device 102 to rotate the blade about a pitch axis 103. The blade 100 includes an airfoil 105 attached to the pitch rotation connector 101.

The pitch rotation connector 101 is positioned on the airfoil 105 to reduce pitch dependent moment about the pitch axis 103 such that a maximum pressure moment about the pitch axis 103 is less than a torque supplied to the blade via the pitch rotation device acting on the airfoil 105. In this regard, the position of the pitch rotation connector 101 (and thus the pitch axis 103) can be configured to prevent and/or dampen pitch oscillation due to a changing load on a governor (e.g., a spring and mass governor). The governor can control the pitch of the blade 100 about the pitch axis 103.

As appreciated by those having ordinary skill in the art, pitch dependent moment can be defined as the moment about the pitch axis 103 caused as a function of a changing pitch, and maximum pressure moment can be defined as the maximum amount of pitch dependent moment that is created along the pitch envelope of the blade. Any other suitable definitions are contemplated herein.

Figure 2:
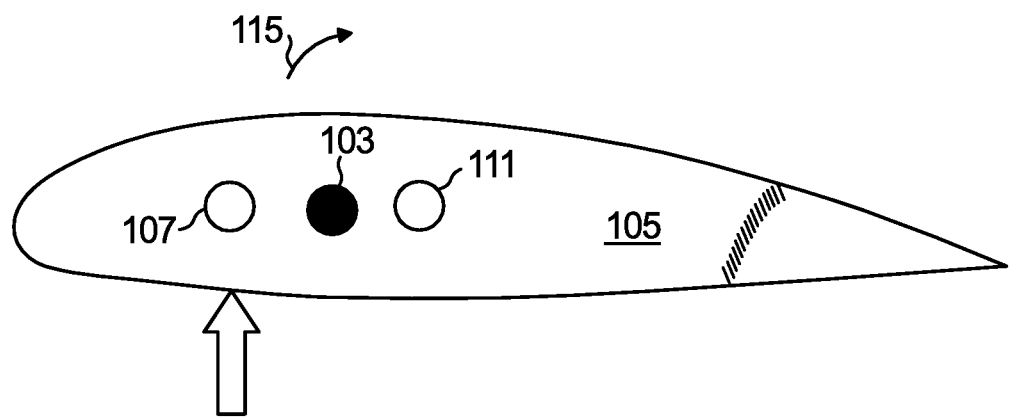
FIG. 2 is a cross-sectional schematic view of a root portion of the blade of FIG. 1, looking tip to root, showing a pressure acting on the airfoil at the center of pressure relative to the axis of rotation causing a clockwise moment about the axis of rotation.
Figure 3:
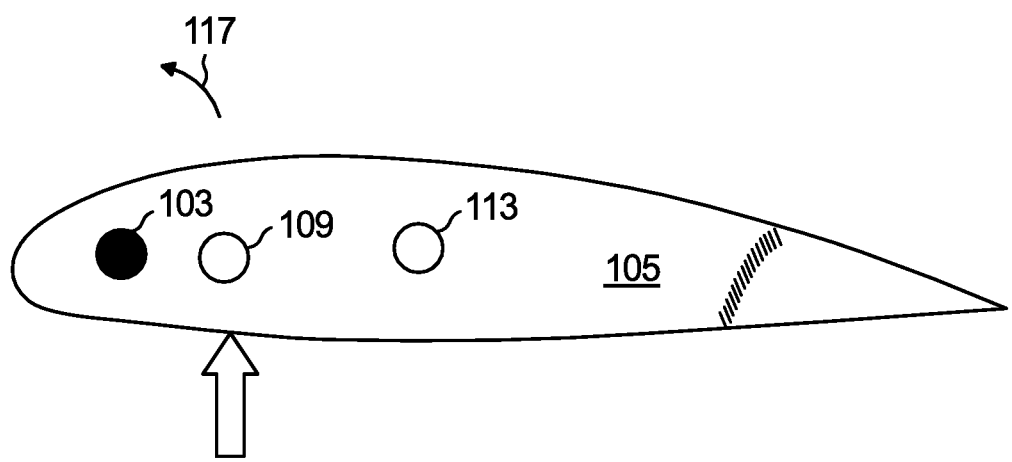
FIG. 3 is a cross-sectional schematic view of a tip portion of the blade of FIG. 1, looking tip to root, showing a pressure acting on the airfoil at the center of pressure relative to the axis of rotation causing a counterclockwise moment about the axis of rotation.
Figure 4:
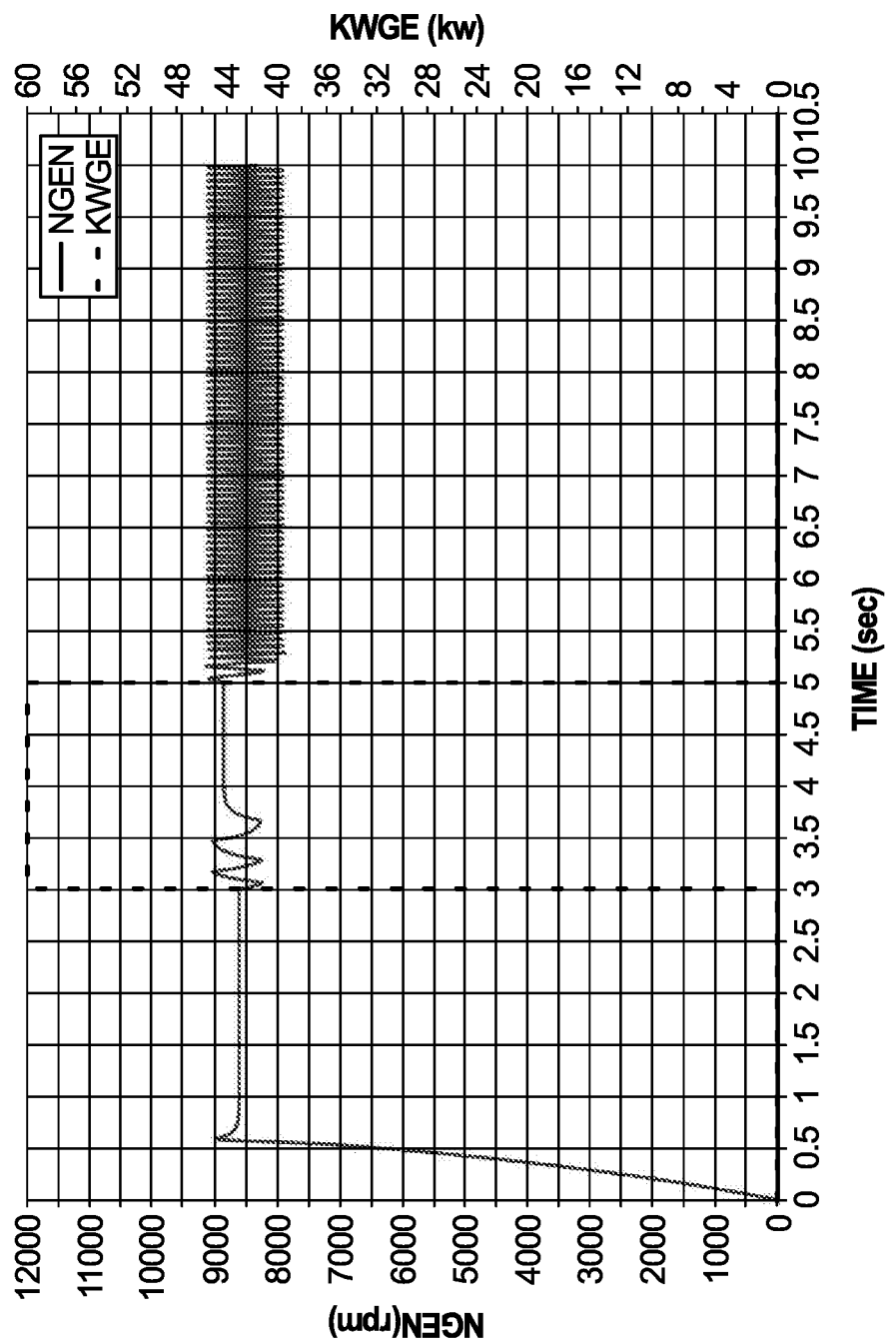
FIG. 4 is a diagram of RPM vs. time as a function of generator load of a blade without reduced pitch dependent moment.

In certain embodiments, to accomplish the desired effect, the airfoil 105 can include a sweep as shown. For example, referring additionally to FIGS. 2 and 3, the root center of pressure 107 of the airfoil 105 can be forward of the pitch axis 103 (as shown in FIG. 2) and a tip center of pressure 109 of the airfoil 105 can be aft of the pitch axis 103 (as shown in FIG. 3). As shown, such a location causes a clockwise moment 115 about the pitch axis 103 at the root (e.g., as shown in FIG. 2) and a counter-clockwise moment 117 about the pitch axis 103 at the tip (e.g., as shown in FIG. 3). As appreciated by those skilled in the art, the center of pressure of an airfoil is located at approximately the quarter-cord of the airfoil.

While the sweep angle θ as shown is a backward sweep, it is contemplated that the sweep can be a forward sweep in certain embodiments. In such a case, the pitch rotation connector 101 can be positioned such that the root center of pressure 107 can be aft of the pitch axis 103 and the tip center of pressure can be forward of the pitch axis 103 (e.g., FIGS. 2 and 3 would be switched). Moreover, any other suitable shape or sweep is contemplated herein (e.g., a non-linear sweep, a parabolic sweep).

As appreciated by those having ordinary skill in the art in view of this disclosure, the pitch rotation connector 101 can be positioned such that the root center of mass 111 and the tip center of mass 113 are in any suitable position relative to the pitch axis 103. As appreciated by those having ordinary skill in the art, the center of mass 111 of the blade 100 can affect the stress on the blade 100. Also the center of mass 111 combined with the center of the mass of the counterweight (e.g., in the governor) determines centrifugal moment that acts to rotate the blade 100 along the blade pitch axis 103 against, e.g., the springs of the governor to operate the governor.

In certain embodiments, as shown in FIG. 1, the pitch rotation connector 101 can be positioned such that the pitch axis 103 can extend through an average center of pressure 119 of the airfoil 105 such that pressure moment (i.e., moment about the pitch axis 103 caused by flow around the airfoil 105) is cancelled out at any pitch angle. In this regard, pressure moment will not change as a function of pitch.

In certain embodiments, the pitch axis 103 can be positioned in any suitable position relative to the average center of pressure 119 without being coincident. For example, the pitch axis 103 can be positioned sufficiently close to the average center of pressure 119 such that the change in moment as a function of pitch does not overcome the pitch rotation device torque to prevent oscillation.

For example, in certain embodiments, the pitch rotation device can be a pitch governor such that the pitch rotation connector 101 is configured to connect to a pitch governor. The pitch governor can be a spring and mass governor. The maximum torque and response times of the pitch governor can be used to determine how close to the average center of pressure the pitch axis 103 should be located to prevent overpowering the governor at any point in use.

In certain embodiments, the blade 100 can be surface processed to improve fatigue life. For example, the blade 100 can be shot peened to provide any suitable enhancement to operating life (e.g., a Miner Sum of less than 0.5). Any other suitable surface processing is contemplated herein.

In accordance with at least one aspect of this disclosure, a ram air turbine (RAT), can include any suitable embodiment of a blade as described above. In accordance with at least one aspect of this disclosure, a method can include preventing and/or damping a pitch oscillation state of a ram air turbine blade by reducing pitch dependent moment about a pitch axis. Reducing pitch dependent moment about the pitch axis can include using a swept blade such that the pitch axis is located between a root center of pressure and a tip center of pressure.

Figure 5:
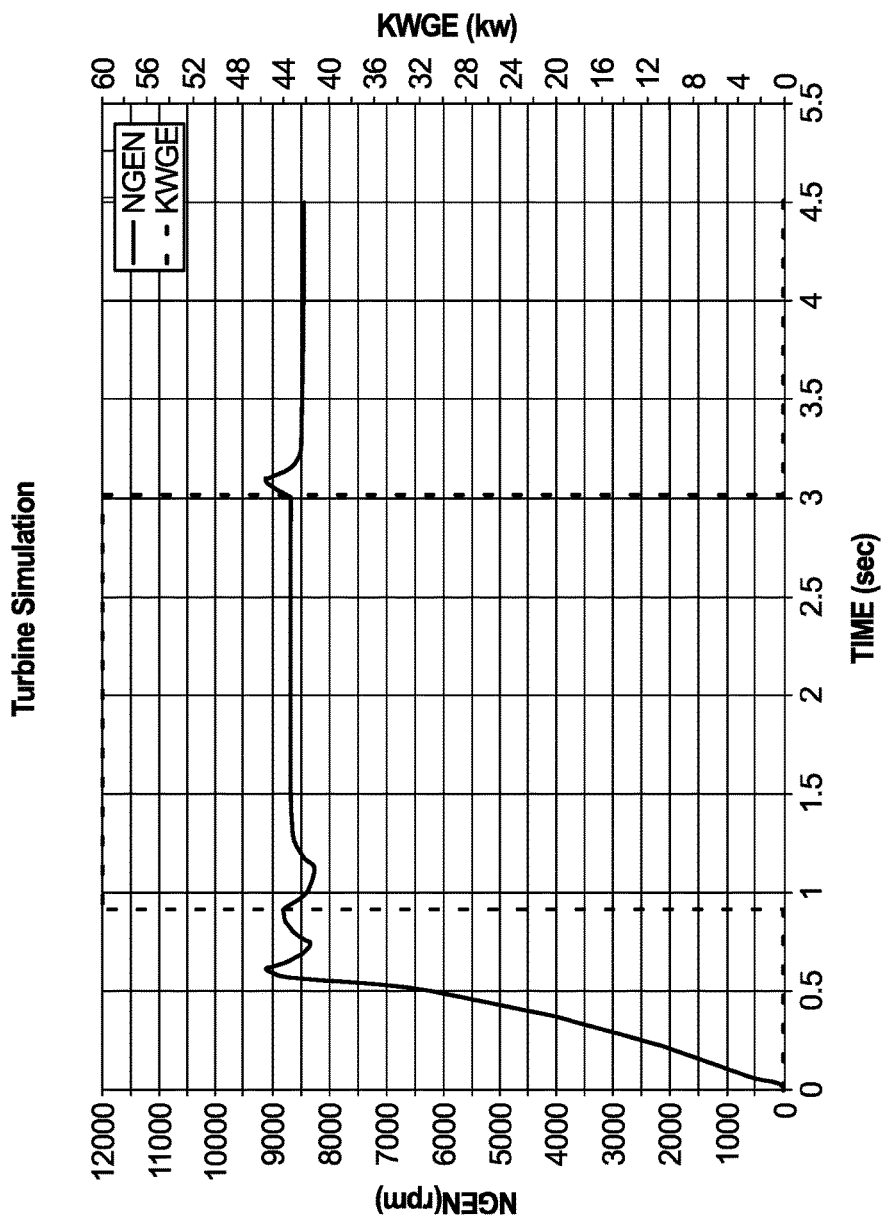
FIG. 5 is a diagram of RPM vs. time as a function of generator load of an embodiment of a blade with reduced pitch dependent moment.

As appreciated by those having ordinary skill in the art, changes in moments about the pitch axis occur in existing systems that are large enough to cause resonant oscillations. For example, referring to FIG. 4, a chart shows a system where addition and removal of a load on a turbine cause an unbounded RPM oscillation due to the changes in moment as a function of blade pitch. Referring to FIG. 5, an embodiment is shown wherein an addition and removal of load does not cause an oscillatory response, but a damped response, as a result of controlling the amount of pitch dependent moment about the pitch axis 103.

As described above, embodiments reduce the change of pitch-dependent moment without adding weight or complexity which is superior to other solutions. Embodiments eliminate instability in certain turbine governing mechanisms. Thus, the sweep reduces the change in moment from aerodynamics for a change in pitch. That is it makes the moment steadier across different blade pitches. Certain embodiments also include a surface treatment to improve the fatigue life of the blades.

The methods and systems of the present disclosure, as described above and shown in the drawings, provide for turbine blades with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A blade arrangement for a ram air turbine, comprising: a pitch rotation connector attachable to a pitch rotation device configured to control rotation of the blade about a pitch axis; and an airfoil rotationally fixed to the pitch rotation connector, wherein the pitch rotation connector is positioned on the airfoil to reduce pitch dependent moment about the pitch axis such that a maximum pressure moment about the pitch axis is less than a torque supplied to the blade arrangement via the pitch rotation device, wherein the pitch axis is located between a root center of pressure and a tip center of pressure.

2. The blade of claim 1, wherein the airfoil includes a sweep and wherein a root center of pressure of the airfoil is forward of the pitch axis and a tip center of pressure of the airfoil is aft of the pitch axis.

3. The blade of claim 2, wherein the pitch axis extends through an average center of pressure of the airfoil such that pressure moment is cancelled out at any pitch angle.

4. The blade of claim 1, wherein the pitch rotation device is a pitch governor such that the pitch rotation connector is configured to connect to a pitch governor.

5. The blade of claim 1, wherein the pitch governor is a spring and mass governor.

6. The blade of claim 1, wherein the position of the pitch rotation connector is configured to prevent and/or dampen pitch oscillation due to a changing load on the spring and mass governor.

7. The blade of claim 1, wherein the airfoil is surface processed to improve fatigue life.

8. A ram air turbine (RAT), comprising:
   a blade including:
      a pitch rotation connector configured to connect to a pitch rotation device configured to control rotation of the blade about a pitch axis; and
      an airfoil rotationally fixed to the pitch rotation connector, wherein the pitch rotation connector is positioned on the airfoil to reduce pitch dependent moment about the pitch axis such that a maximum pressure moment about the pitch axis is less than a torque supplied to the blade via the pitch rotation device, wherein the pitch axis is located between a root center of pressure and a tip center of pressure.

9. The RAT of claim 8, wherein the airfoil includes a sweep and wherein a root center of pressure of the airfoil is forward of the pitch axis and a tip center of pressure of the airfoil is aft of the pitch axis.

10. The RAT of claim 9, wherein the pitch axis extends through an average center of pressure of the airfoil such that pressure moment is cancelled out at any pitch angle.

11. The RAT of claim 8, wherein the pitch rotation device is a pitch governor such that the pitch rotation connector is configured to connect to a pitch governor.

12. The RAT of claim 8, wherein the pitch governor is a spring and mass governor.

13. The RAT of claim 8, wherein the position of the pitch rotation connector is configured to prevent and/or dampen pitch oscillation due to a changing load on the spring and mass governor.

14. A method, comprising: preventing and/or damping a pitch oscillation state of a ram air turbine blade by reducing pitch dependent moment about a pitch axis, wherein the ram air turbine blade includes: a pitch rotation connector that is attachable to a pitch rotation device configured to control rotation of the blade about a pitch axis; and an airfoil is rotationally fixed to the pitch rotation connector, wherein the pitch rotation connector is positioned on the airfoil to reduce pitch dependent moment about the pitch axis such that a maximum pressure moment about the pitch axis is less than a torque supplied to the ram air turbine blade via the pitch rotation device, wherein the pitch axis is located between a root center of pressure and a tip center of pressure, wherein the airfoil is a swept blade.

* * * * *